United States Patent [19]
Sinko

[11] Patent Number: 5,948,147
[45] Date of Patent: Sep. 7, 1999

[54] SYNERGISTIC PIGMENT GRADE CORROSION INHIBITOR COMPOSITIONS AND PROCEDURES

[75] Inventor: John Sinko, Glendale, Wis.

[73] Assignee: Wayne Pigment Corp., Milwaukee, Wis.

[21] Appl. No.: 08/942,586

[22] Filed: Oct. 2, 1997

Related U.S. Application Data

[63] Continuation-in-part of application No. 08/587,817, Jan. 4, 1996, abandoned.

[51] Int. Cl.$^6$ .................................................. C04B 9/02
[52] U.S. Cl. .................................. 106/14.05; 106/14.21; 106/14.25; 106/14.44; 106/14.45; 106/419; 106/425; 106/427; 423/368
[58] Field of Search ............................ 106/14.05, 14.44, 106/14.45, 419, 425, 427, 14.21, 14.25, 14.12; 423/368

[56] References Cited

U.S. PATENT DOCUMENTS

| | | | |
|---|---|---|---|
| 4,707,405 | 11/1987 | Evans et al. | 427/402 |
| 5,176,894 | 1/1993 | Sinko | 106/419 |
| 5,314,532 | 5/1994 | Hughes et al. | 106/419 |
| 5,378,446 | 1/1995 | Sinko | 423/368 |

*Primary Examiner*—Mark L. Bell
*Assistant Examiner*—Scott L. Hertzog
*Attorney, Agent, or Firm*—Ryan Kromholz & Manion

[57] ABSTRACT

A corrosion inhibiting composition for application to a metal substrate such as steel, copper or aluminum includes a film forming organic coating composition and an inorganic pigment which displays synergistic corrosion inhibitive properties. The preferred composition of the corrosion inhibitor pigment includes cation selected from Zn, Al, Mg, Ca, Sr, and ion that a combination of ions including cyanamides, phosphates or phosphites, silicates, carbonates and zinc oxide.

3 Claims, 2 Drawing Sheets

IR Spectrum of Synergistic Corrosion Inhibitor Pigment According to 1.1 of Example #1

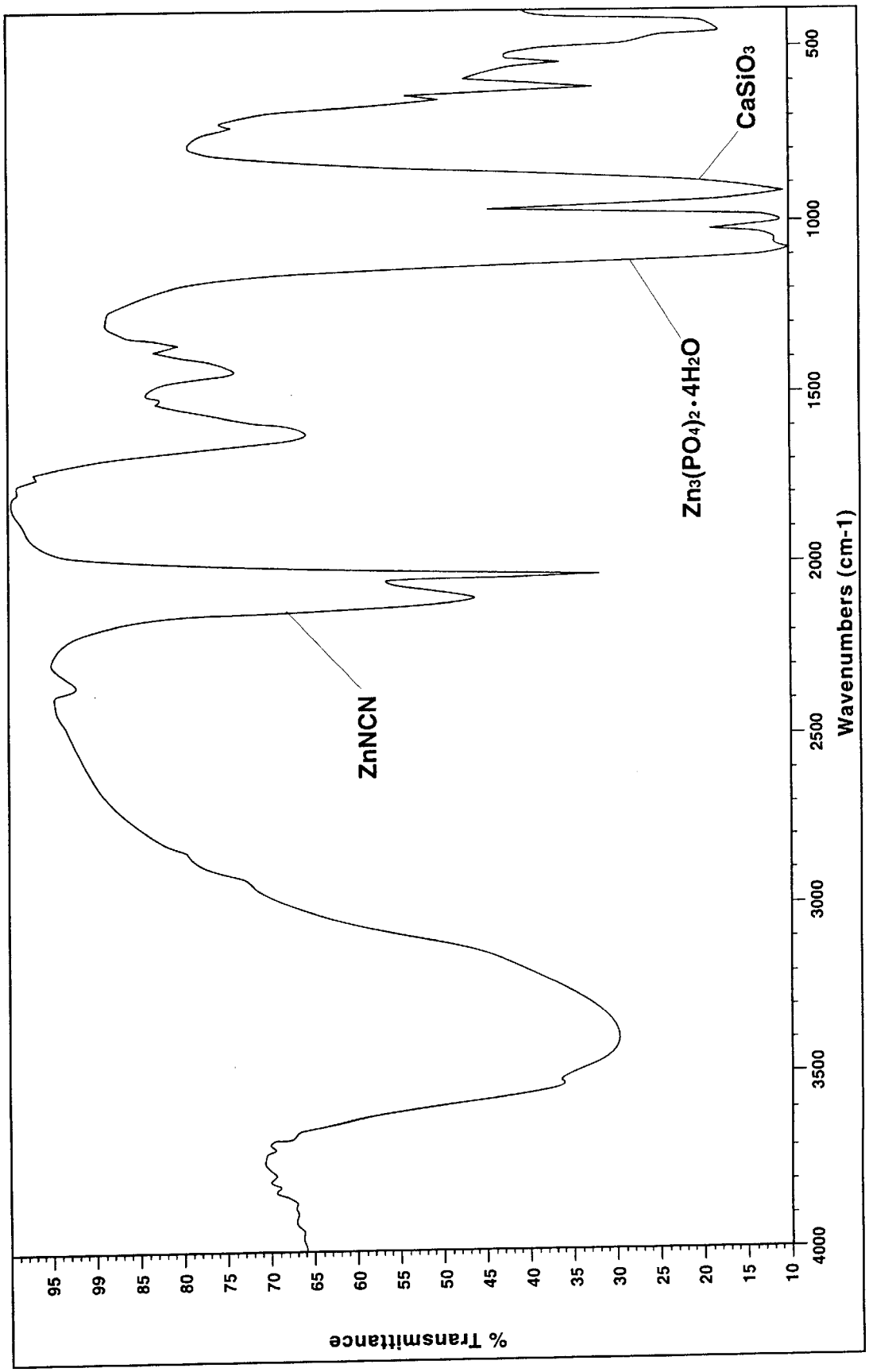
Fig. 1 IR Spectrum of Synergistic Corrosion Inhibitor Pigment According to 1.1 of Example #1

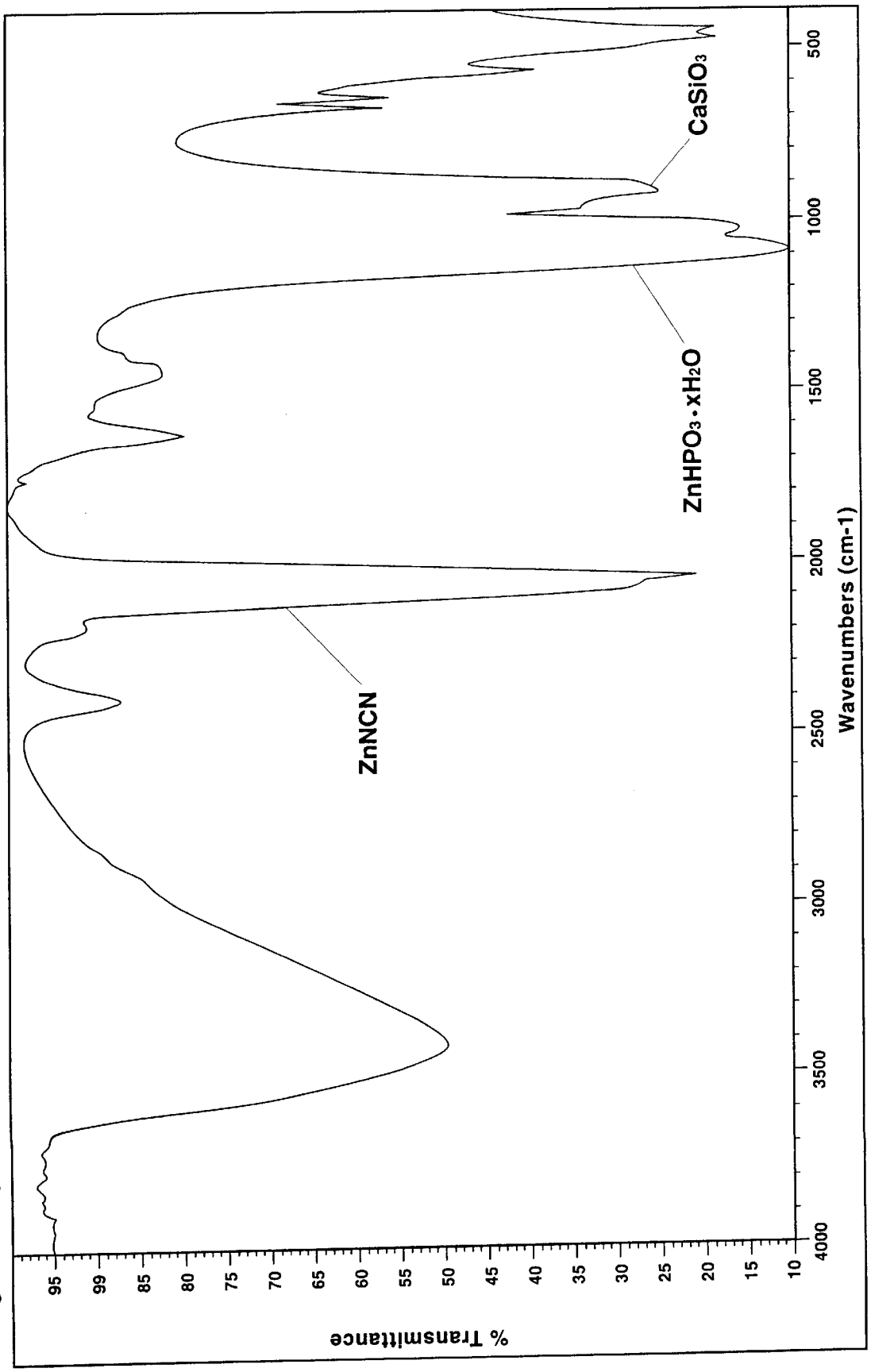
Fig. 2 IR Spectrum of Composite Pigment According to Comparative Example #3

SYNERGISTIC PIGMENT GRADE CORROSION INHIBITOR COMPOSITIONS AND PROCEDURES

RELATED APPLICATION

This application is a continuation-in-part of copending application Ser. No. 587,817 filed Jan. 4, 1996, abandoned.

FIELD OF INVENTION

The present invention relates to pigment compositions and processes for inhibition of corrosion of metals.

BACKGROUND OF THE INVENTION

Commercially available corrosion inhibitor pigments generally used for Fe, Al, or Cu protection, belong exclusively to only a few generic types of inorganic compounds, such as chromates, phosphates or polyphophates, molybdates, borates, silicates and phosphites of Zn, Ca, Sr, Ba, Al, Mg, Pb, Cr, Fe, or various combinations of these anionic and cationic species. Some of the latter cationic species, particularly Ba, Pb and Cr are known to be toxic. Transition metal derivatives of hydrogen cyanamide, particularly ZnNCN are also known for pigment grade application, limited, however, to special mirror backing coatings intended for Ag protection.

The active inhibitor species generally are the anionic constituents. The cations present, however, determine important physical properties of such pigments, i.e: solubility or kinetic availability of the effective species.

Chromates and particularly $SrCrO_4$, (characterized by desirable combination of relatively high $CrO_4^{-2}$ content and optimal solubility) are regarded in the art, as being the most versatile, being compatible with all paint vehicles, highly effective on all metal substrates, and thus being effective, although toxic, pigment grade corrosion inhibitors.

It is the redox activity of chromate species, accountable for their inhibitive efficiency, which allows interference with both anodic and cathodic corrosion processes. As a consequence, chromates are considered anodic-cathodic or "mixed" type inhibitors. A direct result of Cr(VI) reduction by corrosion processes, the formation of Cr(III) species in situ of metal substrates' protective oxide layers is a distinctive feature of chromate's corrosion inhibitive mechanism. As a consequence, the protective oxide layer on Fe, for example, is assumed to be a composite of increased hydrolytic stability formed by Fe(III) and Cr(III) species.

In contrast with chromates, all the other above specified active corrosion inhibitive pigments, and more specifically the pertinent anionic constituents of phosphates, molybdates, silicates, borates, phosphites and cyanamides are "redox inactive" under normal conditions of metal corrosion. Consequently they do not qualify as electrochemically active corrosion inhibitors.

A characteristic feature of "redox inactive" pigments' inhibitive mechanism is the related anionic species' limited ability to interfere with corrosion processes. It is assumed that "redox inactive" inhibitive species are active in anodic environments, presumably by a mechanism of insoluble precipitate formation, involving anodically solubilized metal cations. There are, however, significant consequences of "redox inactive" pigments' less efficient corrosion inhibitive mechanism. In this sense, generally, it can be stated, that non-chromate based pigment grade anodic corrosion inhibitors are less effective, and thus qualitatively inferior, but, however, non-toxic alternatives to the chromates. This situation also applies to diverse, multi-phase pigment systems which contain various combinations of anionic and cationic species as above disclosed.

In contemporary industrial practice pigment grade non-toxic alternatives to chromates enjoy commercial acceptance, limited practically, however, to applications intended for iron or steel protection. More specifically, it is well known that in aircraft and coil coatings, where top corrosion inhibitive performances are required, chromate pigments, and specifically $SrCrO_4$, have no equally effective chromate-free alternatives.

All known electrochemically active pigment grade corrosion inhibitors, which represent the state of the art, display some degree of substrate specific behavior. For example, chromates and particularly $SrCrO_4$, highly effective pigment grade inhibitors applicable practically on all metals (such as Fe, Al, Cu) are known to actually promote Ag corrosion and consequently are incompatible with such substrates.

Non-toxic alternatives to chromates such as phosphates, molybdates, borates, silicates and diverse combinations of the same, are valued, although less efficient inhibitors of Fe corrosion, which however, perform poorly on Al, Cu and are just as incompatible with Ag. Their industrial application is thus limited practically to anti-corrosive protection of Fe.

In view of these considerations, it has been widely concluded that development of equally effective, non-toxic inorganic alternatives to pigment grade chromates is not a realistic probability. Thus, a need has existed which presents a challenge to those dealing with the chemistry of corrosion inhibitors to develop such chromate-free pigment grade products, able to close the above-described performance gap, which exists between the best non-chromate based and chromate based inhibitor pigments.

The real challenges faced in inhibitor pigment development, become apparent by taking into account the general requirements imposed by the actual commercial and industrial practice (such as high inhibitive efficiency, low toxicity and environmental hazard, competitive price and versatility in application) as well as by considering the limited number of anionic and cationic species suitable for pigment synthesis.

The present invention, thus, concerns the development of multi-phase pigment systems which display synergy in respect of corrosion inhibition and are constituted essentially of various combinations of the above-mentioned limited number of qualified ionic species. It must be kept in mind, however, that synergistic behavior in respect of corrosion inhibition is not an ordinary occurrence observable with just any random mixtures of chemically different, finely divided solid constituents containing inhibitor species. A high degree of synergy, rather, is an unpredictable property of some multi-phase pigment systems of distinct chemical and phase composition, having two or typically more solid component phases, which individually are all characterized by comparatively lower corrosion inhibitive activity than the combined system itself. Notably, the active component phases of the system, preferably all insoluble in organic media, should nonetheless be water soluble to a limited but effective extent.

There are essentially three different physical states in which two (or more) microcrystalline or amorphous component phases of distinctively different chemical composition can co-exist as constituents of multi-phase and finely divided solid systems: ordinary physical mixtures, microcomposites and solid solutions.

Solid solutions, although formed spontaneously, are not the ordinary state found in multi-phased solid systems. In some cases however, distinct combinations of three or more anionic and cationic constituents, which ordinarily form two or more solid phases of distinct chemical composition, in special conditions form unified solid phases of complex chemical composition. Such unified phases are characterized by uniform distribution at molecular level of all constituent ionic species. It will be noted that significant numbers of colored pigment grade products are known to consist of solid solutions, such as chrome yellows or molybdate oranges, which are solid solutions of $PbCrO_4$ and $PbSO_4$, or, in addition, of $PbMoO_4$, respectively. An applicable example is disclosed in my U.S. Pat. No. 5,558,706. Notably, solid solutions are characterized by distinct values of physical parameters such as solubility, specific gravity, etc.

Ordinary mixtures of finely divided (and normally polydispersed) solid phases of different chemical composition are constituted of distinct and separable microparticles of the distinct component phases, mixed and uniformly distributed in the system. Ordinary mixtures can be prepared by simple mechanical procedures. However, they are often formed spontaneously in chemical processes as well, such as during concurrent or subsequent formation by precipitation of two or more solid phases in aqueous systems.

Conversely, micro-composite (multi-phase and finely divided) solid systems are constituted of microparticles, containing distinctly identifiable, but physically inseparable component phases of different chemical composition which form common interfaces and are held together by chemical forces. Typically, composite microparticles possess a morphological configuration of a coating-core type, often formed in some heterogenous chemical processes, such as described in my U.S. Pat. No. 5,176,894, wherein a finely divided suspension of an essentially insoluble solid reactant is reacted with a dissolved component reagent of a liquid phase and consequently is converted into a finely divided suspension of a solid reaction product, which is insoluble in the reaction medium. During the course of the reaction the suspended solid phase consists of composite micro-particles of a coating-core configuration, in which both solid component phases, ie., the reaction product coating and the reactant core are simultaneously present, separated by an interface of approximately spherical shape. This mechanism, obviously, implies the reagent species' continuous diffusion through the coating phase toward the reactant core and generally, the reaction is diffusionally impeded. Thus, by preventing completion of the reaction, the solid product's micro-composite state is preserved. As used herein, "microparticles" are defined as particles having diameters of approximately 0.5 to 10 microns. The preferred particles are in an approximate diameter range of 1 to 5 microns.

Notably, there are also numerous examples known to the art regarding preparation of micro-composite multi-phase solid systems (consisting of micro-particles with coating-core structural morphology) which, in comparison, relate to a quite different process and mechanism. Known as "particle encapsulation" procedures, widely used in the pigment manufacturing industry, are the formation by precipitation of chemically inert coatings of diverse chemical composition on the surfaces of finely divided solids in aqueous suspension.

SUMMARY OF THE INVENTION

It is a principal object of the present invention to provide multi-phase pigment grade corrosion inhibitors for metals which are characterized by synergistically enhanced effectiveness synergistic behavior with respect to corrosion inhibition is understood as the capacity of pigment grade compositions to display, in identical coating formulations, essentially similar or enhanced corrosion inhibitive performance in comparison the individual phase components.

In accordance with the invention, multi-phase pigment grade products offer functional advantages in comparison to simple, mono-phase inhibitor pigments. These advantages include synergistic behavior with respect to corrosion inhibition. In contrast with mono-phase solids, multi-phase corrosion inhibitor pigments saturate aqueous phases, which are in intimate contact with constituent ionic species present.

Understandably, then, in qualitative terms, the actual ionic content of aqueous phases saturated by multi-phase pigments is complex, including the chemical composition of all component phases. In quantitative terms, however, the ionic content will be determined by secondary processes of precipitate formation and the applicable solubility rules. The concept is conveniently exemplified by observing that the pH of saturated aqueous leachates of multi-phase solids is the result of initial solubilization of all available component phases and of subsequent neutralization processes.

Considering that, as is well known, metal surfaces in contact with moderately alkaline aqueous phases tend to be in a passive state with respect to corrosion, the importance of the pH of corrosion inhibitive pigments becomes evident. Synergistic behavior with respect to corrosion inhibition of multi-phase pigments characterized by distinct chemical and phase compositions, can be qualified as the consequence of cooperative (rather than antagonistic) contribution of several active ionic species involved in the inhibition process.

Considering that synergistic behavior is unpredictable, synthesis of multi-component pigment systems with a high degree of synergy as to corrosion inhibition, remains an empirical exercise.

BRIEF DESCRIPTION OF DRAWINGS

FIGS. 1–2 are graphical prints representing IR spectra pigments produced pursuant to the invention.

DETAILED DESCRIPTION

The synthesis of pigment grade products, pursuant to the present invention is preferably accomplished by combining selected constituents according to specific procedures. Inorganic constituents preferred according to the present invention are as follows:

Cations: Zn, Al, Mg, Ca, Sr, Ti, Zr, Ce, Fe;

Anions: phosphate, polyphosphates, phosphites, molybdates, silicates and cyanamides.

Accordingly, inorganic compounds typically present in synergistic corrosion inhibitive piments synthesized pursuant to the present invention, are: $Zn_3(PO_4)_2.(H_2O)_x$, x=2–4; $MgHPO_4.(H_2O)_3$, $AlPO_4$, $CaSiO_3$, Sr— or $CaMoO_4$, ZnNCN and combinations of the same.

It was discovered that a multi-phase solid inorganic system which consists of ZnNCN, $Zn_3(PO_4)_2.(H_2O)_4$, ZnO, $CaSiO_3$ and $SrCO_3$ component phases in specific molar ratios, displays high degree of synergy as to corrosion inhibition. More specifically, it was found that the multiphase solid system, in its preferred composition symbolized by the chemical and phase-composition formula

if applied as pigment component of protective primers, displays significantly enhanced corrosion inhibitive activity on steel. A detailed description of the multi-phase pigment system's synthesis, more specifically in its preferred chemical composition, is disclosed in Example 1.1. Pursuant to the invention, the synthesis is preferably carried out in three distinct and successive steps: (1) preparation of a mixed aqueous suspension, (2) "in situ" formation of zinc phosphate phase and (3) "in situ" formation of the cyanamide phase.

An aqueous mixed dispersion is initially prepared and completely rehydrated by extensive stirring, containing finely divided highly reactive ZnO with an average particle size of 0.25 micron, assay >99%), mineral grade $CaSiO_3$ (fineness of 100%+325 mesh) and technical grade $SrCO3$ (fineness of 100%+270 mesh) in a preferred 1.0/0.6/0.075 molar ratio, respectively. Subsequently, zinc phosphate is prepared "in situ" by introducing into the mixed suspension, 0.38 moles of H3PO4, in about 60 min. at normal temperature and intense agitation.

Considering the selected reaction conditions and the ZnO component's high reactivity (very high specific surface area and highest value of the molar ratio) in comparison to $CaSiO_3$ and $SrCO_3$ components', it is believed that the zinc phosphate formation, as follows, is selectively favored:

$$ZnO+0.38H_3PO_4 \rightarrow 0.19Zn_3(PO_4)_2(H_2O)_4/0.43ZnO \quad (1)$$

whereas, the other possible processes, such as $$3\ CaSiO_3+2H_3PO_4 \rightarrow Ca_3(PO_4)_2+3\ H_2SiO_3 \quad (2)$$

$$SrCO_3+H_3PO_4 \rightarrow SrHPO_4+CO_2+H_2O \quad (3)$$

are severely obstructed kinetically. As a consequence, the $CaSiO_3$ and $SrCO_3$ component phases, although definitely surface-modified by reactions 2 and 3, "in bulk" are certainly unaltered under the specified reaction conditions applied. Notably, the actual carbonate content of the final product (see Table 1.1) is consistent with the above statement regarding reaction 3.

As for the nature of the above-mentioned surface modifications, the formation of chemisorbed insoluble Ca-phosphate and Sr-phosphate layers on the surfaces of $CaSiO_3$ and $SrCO_3$ component phases, respectively, is assumed. Based on theoretical considerations, experimental evidence, and the very limited thickness of the chemisorbed layers, the absence of modification of the system's chemical composition is observed.

It is important to note, however, that surface modification of solid phases results in significant changes of some surface properties of the same, such as solubility and pH. Notably, as observed pursuant to the present invention, the pH of surface modified $CaSiO_3$ according to reaction 2 (determined from pH of saturated aqueous leachate), is reduced from its initial value of pH=9.5 to approximately pH=7.6. Such surface modified $CaSiO_3$ and $SrCO_3$ component phases as above described, are considered characteristic constituents of the multi-phase pigment system according to the present invention.

After Reaction 1 is consummated, the system's solid phase composition is best described as an ordinary mixture of finely divided component phases, specifically of surface modified $SrCO_3$, surface modified $CaSiO_3$ and of the solid product of Reaction 1. Without supportive experimental evidence, however, the phase composition of the product of Reaction 1 is considered to be a complex one. It is believed to consist of composite micro-particles formed of $Zn_3(PO_4)_2.(H_2O)_4$ and unreacted ZnO component phases, in a coating-core configuration. This hypothesis is plausible, considering the stoichiometrical ratio applied and observing that Reaction 1 is heterogenous, ie., it proceeds uniformly on the entire surface area (simultaneously on each particle) of the ZnO phase and results in zinc phosphate, characterized by notably low solubility.

As the final step of the synthesis, "in situ" preparation of ZnNCN phase is performed, subsequent to completion of Reaction 1, by introducing 0.25 moles of $H_2NCN$ into the reaction system, at normal temperature and intense agitation. Favored by solubility rules, CaNCN and SrNCN being very soluble, Reaction 4 occurs selectively, as follows:

$$0.19\ Zn_3(PO_4)_2.(H_2O)_4/0.43\ ZnO+0.25 \quad (4)$$

$$H_2NCN \rightarrow 0.19\ Zn_3(PO_4)_2.(H_2O)_4/0.25\ ZnNCN/0.18\ ZnO$$

The occurrence of Reaction 4 observed pursuant to the present invention, was unexpected, especially in that the coating-core structural configuration (at micro-crystalline level) of the zinc phosphate-ZnO composite phase, does not significantly obstruct the progress of Reaction 4. The same reaction is known to be obstructed in several alternative systems, wherein various Zn compounds, other than zinc phosphate, form coatings on the surface of the ZnO phase. All observations made pursuant to the present invention are consistent with the hypothesis that apparently, Reaction 4 occurs heterogeneously at the zinc phosphate-ZnO interface, implying H2NCN diffusion through the zinc phosphate coating phase. Consequently, Reaction 4 according to the present invention, yields a finely divided product of distinct and complex phase composition, which include $Zn_3(PO_4)_2.(H_2O)_4$, ZnNCN and ZnO, presumably, in a coating-core configuration.

Based on these considerations, consistent also with the subsequently presented pertinent analytical data, the multi-phase pigment grade product obtainable according to the present invention, can be described as an ordinary mixture of finely divided three component phases: surface modified $SrCrO_3$, surface modified $CaSiO_3$ and the product of Reaction 4, the latter being a micro-composite, presumably consisting of 3 component phases.

The distinct chemical and phase composition of this preferred embodiment of the present invention can be symbolized by the formula:

$$[0.77Zn_3(PO_4)_2.(H_2O)_4/ZnNCN/0.77ZnO]+[2.42CaSiO_3]sm+[0.3SrCO_3]sm$$

where brackets "[ ]" mark independent component phases and "sm" indicates surface modification.

It will be, however, apparent to those skilled in the art, that alternative versions of the multi-phase corrosion inhibitive pigment systems can be synthesized pursuant to the present invention using different molar ratios of the component phases, as well. Also, by substituting $H_3PO_4$ for $H_3PO_3$, $H_4P_2O_7$ or various mixtures of the same, such as $H_3PO_4+H_3PO_3$, qualitatively different pigment systems result, which will consist of component phases, as follows: $Zn_3(PO_4)_2.(H_2O)_4$, $ZnHPO_3(H_2O)_2$, ZnNCN, ZnO and surface modified $CaSiO_3$ and $SrCO_3$.

Notably, Comparative Example 3 discloses the synthesis and pertinent analytical data of a such, qualitatively different version of the multi-phase (synergistic) corrosion inhibitor pigment (according to the present invention), which, alternatively, contains a ZnHPO₃ component phase, as the result of the following reaction:

$$ZnO + 0.36\ H_3PO_3 \longrightarrow 0.36\ ZnHPO_3/0.64\ ZnO \quad (5)$$

In similar fashion to Reaction 2 and Reaction 3, concurrent surface modification of CaSiO₃ layers, is also assumed.

As for the formation of ZnNCN component phase, it occurs according to $$0.36\ ZnHPO_3/0.64\ ZnO + 0.25\ H_2NCN \longrightarrow$$

$$0.36\ ZnHPO_3/0.25\ ZnNCN/0.39\ ZnO \quad (6)$$

a process similar to Reaction 4; based on available analytical data and IR spectra presented in FIG. 2, the multi=phase product can be symbolized by the chemical and phase composition formula, as follows:

$$[1.44\ ZnHPO_3\ H_2O/ZnNCN/1.56\ ZnO] + [2.42\ CaSiO_3]sm + [0.3\ SrCO_3]sm$$

As above specified, the synergistic behavior of multi-phase pigment systems is generally defined in terms of increased corrosion inhibitive efficiency, to compared to the individual included component phases and also in comparison to simple mixtures of the included components. In practice, synergistic behavior is observable by experimental assessment of a multi-phase pigment's corrosion inhibitive performance in metal primer applications, versus that of the individual included components under identical experimental conditions.

Pursuant to this invention, the pigment system's synergistic behavior was experimentally demonstrated in solvent based medium oil alkyd primer applications on cold rolled steel. For that purpose, test versions of the primer formulations were prepared, containing the multi-phase pigment system and, alternatively, at equal loadings, the following pigment quality component phases:

$$ZnNCN,\ Zn_3(PO_4)_2 \cdot (H_2O)_4,\ CaSiO_3,$$

or the following combinations of the same:

$$0.6\ Zn_3(PO_4)_2 \cdot (H_2O)_4/ZnNCN$$

or $$Zn_3(PO_4)_2 \cdot (H_2O)_4/1.1\ ZnO$$

The properties of the tested component phases are specified in Table 1.3. When possible, commercially available pigment grade products were employed, such as CaSiO₃ or ZnNCN, zinc phosphate tetrahydrate and SrCrO4, the latter all manufactured by Wayne Pigment Corp.

Notably, however, the above identified combinations of component phases were synthesized, as disclosed in Comparative Examples 1 and 2, respectively. To compensate for the differences in specific gravity values of the tested inhibitor pigments, PVC (pigment volume concentration) values of all test formulations, inclusive of control's, were kept identical by appropriate adjustment of the pertinent talc filler. It will be noted that essentially two controls were included in the test set: one, identified as "control," with no corrosion inhibitor pigment, talc load having been adjusted and a formulation containing SrCrO4, the standard pigment grade inhibitor of the industry.

Described in detail in Example 1.2, the performance evaluation of the tested inhibitor pigments was carried out as follows: all of the test formulations were spray-applied on cold rolled steel panels, at an approximately 1.5 mil dry thickness, cured, scribed and subjected to salt spray conditions for 300 hours, according to ASTM B-117; the test coatings' protective performances, considered to be proportional with the respective pigment components' corrosion inhibitive performance, were quantified according to ASTM D-714. By employment of a double control, a more reliable assessment of the tested pigments' corrosion inhibitive performance was obtained. The "double control" performance scale, (delimited by the two extreme corrosion inhibitive performances, i.e., the one observed for pigment grade talc with no corrosion inhibitive activity and that for SrCrO₄, respectively, the latter being characterized arguably as having the highest available activity of inhibition of steel corrosion, allows demonstration and quantification, as well, of the multi-phase corrosion inhibitive pigment's synergistic behavior.

The comparative results of the performance evaluation are presented in Table 1.3; as can be seen, the multi-phase corrosion inhibitive pigment synthesized according to Example 1.1 of the present invention, inhibits steel corrosion at a level very comparable to that of SrCro₄ and significantly more effectively than its own component phases, individually. Pertinent overall performance grades observed for the multi-phase corrosion inhibitor pigment, the component phases and SrCrO₄ (8, 0, and 9, respectively), manifest a high degree of synergy with respect to corrosion inhibition by the multi-phase corrosion inhibitor pigment. Thus, because of its efficient inhibitive activity and distinct chemical composition, the synergistic multi-phase corrosion inhibitive pigment system of the present invention, provides a valuable addition to the available arsenal of non-chromate based pigment grade corrosion inhibitors.

The following examples disclose preferred procedures for reduction to practice of the present invention, with no intention however, to limit the applicability of the invention to the specific procedures. Other aspects of the invention also will be further illustrated by the following examples, wherein all percentages are given by weight unless otherwise indicated.

EXAMPLES

Comparative Examples

Comparative examples subsequently presented disclose procedures, applied pursuant to the present invention, to synthesize such two-phase pigment grade corrosion inhibitors, which represent pair combinations of some of the component phases of the multi-phase (synergistic) corrosion inhibitor pigment system, the latter discovered pursuant to the present invention. Comparative Example 3 discloses the synthesis of a multi phase corrosion inhibitor pigment which alternatively contains ZnHPO₃ as a component phase.

In order to demonstrate that synergistic behavior in respect of corrosion inhibition is not a trivial occurrence, but rather is associated with distinct chemical and phase composition of some multi-phase systems, both two-phase pigment grade corrosion inhibitors were included in the set of pigments (all component phases) evaluated for their corrosion inhibitive performance in comparison with the multi-phase pigment system itself, which the formers are components of.

Results are presented in Table 1.3.

Comparative Example 1

A two-phase pigment grade corrosion inhibitor, symbolized by 0.6 Zn₃(PO₄)₂·(H₂O)₄/ZnNCN (theoretical) phase composition formula, was synthesized pursuant to the present invention, as follows:

1.0 moles of finely divided and high quality ZnO (see Example 1.1), initially dispersed in 1000 ml water at normal temperature and intense, extended agitation, was reacted with 0.43 moles of diluted H3PO4, added into the system under the same reaction conditions, in one hour. Subsequently, after 30 min. agitation, 0.4 moles of H2NCN (diluted solution) was introduced in additional 20 min., and the process was completed by keeping the reaction system under the same conditions for several hours.

The synthesis was finalized in identical fashion as disclosed in the final section of Example 1.1.

Approximately 140 g. of final product were recovered, characterized by quality parameter values as follow:

specific gravity—2.91
pH (aqueous leachate)—7.5

Comparative Example 2

Two-phase pigment grade corrosion inhibitor, symbolized by $Zn_3(PO_4)_2.(H_2O)_4/1.1\ ZnO$ phase composition formula, was synthesized by reacting 1.0 moles of ZnO with 0.49 moles of $H_3PO_4$, in identical conditions as presented in the applicable section of Comparative example 18B.

The approximately 134 g. of final product recovered, was characterized by as follow:

specific gravity—3.13
pH (aqueous leachate)—7.9

Comparative Example 3

Pigment grade multi-component corrosion inhibitor, symbolized by (theoretical) phase composition formula of $[1.44.ZnHPO_3.H_2O/ZnNCN/1.56\ ZnO]+[2.42\ CaSiO_3]sm+0.3\ SrCO_3]sm$ was synthesized in identical fashion as described at Example 1.1, except that in this case, the initially prepared ($ZnO/0.6\ CaSiO_3/0.75\ SrCO_3$) mixed dispersion was reacted with 0.36 moles of $H_3PO_3$ (from Aldrich Chemical Co.) as 50% aqueous solution. The obtained product, processed identically as above mentioned, was dried at 60–70° C.

Related analytical data and IR spectra are presented below and in FIG. 2, respectively.

| Measured Quality Parameters | Determined Values |
|---|---|
| Appearance | white powder |
| Zn total % | 32.2 |
| NCN % | 10.4 |
| Carbonate, as $SrCO_3$% | 5.3 |
| $H_2O$ % (by loss at 200° C.) | 3.4 |
| pH | 6.3 |
| Spec. gravity | 2.92 |
| Yield, g. | 192.0 |

Examples of Realization of the Present Invention

All examples of realization hereinafter presented, disclose the manufacturing procedure, the chemical and phase composition formula of the multi-phase pigment grade corrosion inhibitor obtainable according to the present invention.

Experimental data regarding applicability in primer formulations as well as regarding synergistic behavior in respect of corrosion inhibition of the multi-phase pigment, are also presented.

Example 1

1.1: Multi-component pigment grade system, characterized by synergistic behavior in respect of inhibition of steel corrosion, symbolized by the theoretical phase composition formula of $[0.77.Zn_3(PO_4)_2.(H_2O)_4/ZnNCN/0.77.ZnO]+[2.42.CaSiO_3]sm+[0.3.SrCO_3]sm$ where [ ] mark independent component phases and "sm" indicates surface modification, was synthesized according to the following procedure:

Mixed suspension, containing finely ground 1.0 moles (81.38 g.) of ZnO (AZO 66 grade, characterized by 0.25 micron average particle size, assay: >99.9%, from American Smelting and Refining Co.), 0.075 moles (11.0 g.) of commercial grade $SrCO_3$ and 0.6 moles (69.5) of commercial grade $CaSiO_3$ in 1000 ml water, was prepared by extensive agitation at normal temperature of the above mixture. Aqueous solution of about 50%, containing 0.38 moles $H_3PO_4$ was introduced first, at ambient temperature, into the intensively stirred mixed suspension in approximately 60 minutes; subsequently, 0.25 moles of $H_2NCN$ (as aqueous solution of 50 weight %, available from S.K.W., Germany) were introduced into the reaction mixture, after which, by keeping the same reaction conditions, the process was finalized in one hour.

The resultant product suspension's solid phase was separated by filtration without washing, and in order to preserve tetrahydrate composition of the zinc phosphate constituent, the presscake was dried at moderate temperature of 70–80° C.; the dry product was subsequently pulverized to a fineness of 100%+270 mesh.

Related analytical data and IR spectrum are presented in Table 1.1 and FIG. 1 respectively.

TABLE 1.1

| Measured quality parameters | Determined values |
|---|---|
| Appearance | white powder |
| Zn total % | 32.0 |
| NCN % | 10.7 |
| Carbonate as SrCO3 % | 5.1 |
| pH | 7.5 |
| Oil absorption, lbs/100 lbs | 34.0 |
| Spec. gravity | 2.95 |
| $H_2O$ % (by loss at 200° C.) | 5.0–6.0 |
| Yield, g. | 210.0 |

1.2: Multi-component pigment grade composition according to Example 1.1., was evaluated in a solvent based medium oil alkyd formulation (see Table 1.2.) for synergistic behavior with respect to inhibition of steel corrosion. For that purpose, the control formulation (with no corrosion inhibitor pigment) and distinct test formulations were prepared, containing alternatively the multi-component pigment composition (according to Example 1.1), its constituent phases (more specifically, pigment grade ZnNCN, $CaSiO_3$—Wollastonite grade, $Zn_3(PO_4)_2.(H_2O)_4$), also mixtures of ZnNCN/$Zn_3(PO_4)_2(H_2O)_4$ $ZnO/Zn_3(PO_4)_2.(H_2O)_4$ and pigment grade $SrCrO_4$ (standard of the industry), respectively (see Table 1.3. for pigment identification) and spray-applied on Cold Rolled Steel panels (from The Q-Panel Co.) at 1.5 mil film thickness. Air dried, aged overnight at 130° F., the exhibits were scribed and subsequently exposed to salt spray conditions for 300 hours, according to ASTM B-117 and evaluated by ASTM D-714; the test coatings overall corrosion inhibitive performances, considered directly proportional with pertinent pigments' corrosion inhibitive activity, were comparatively evaluated and graded on 0 (worst) to 10 (best) scale. Test results are presented below in Table 1.3.

TABLE 1.2

| Components of Test Formulation | Trade Names and Suppliers | Parts by Weight |
|---|---|---|
| *Mill Base* | | |
| Medium Oil Alkyd Resin | Duramac 2455 (1) | 233.5 |
| Solvent | Xylene | 85.5 |
| Filler Pigments | Red iron oxide 1646 (2) | 32.2 |
| | 40-27 Talc (3) | 208.0 |
| Antisettling | Bentone 38 (4) | 4.0 |
| Pigment Grade Corrosion Inhibitors | * see Table 19.3 | 58.5 |
| *Letdown* | | |
| Resin | Duramac 2455 | 293.0 |
| Solvent | Xylene | 74.0 |
| Driers | 6% Cobalt Drier (5) | 2.3 |
| | 6% Zirco Drier (5) | 21.8 |
| Antiskinning | Methyl ethyl Ketoxime | 2.3 |
| | | Volume: approximately 100 gal |

Raw material suppliers:(1) McWhorther Technologies; (2) U.S.Oxides; (3) Pfizer Inc., Chemical Div.; (4) Rheox,Inc.; (5) Interstab Chemicals, Inc.

Technologies; (2) U.S.Oxides; (3) Pfizer Inc., Chemical Div.; (4) Rheox,Inc.; (5) Interstab Chemicals, Inc.

TABLE 1.3

Comparative results of corrosion inhibitive performance evaluation of the multi-phase pigment (according to the present invention) and of its component phases.

| Inhibitor Pigment Component of Test Coatings | Status of Test Coatings After 300 Hours | Overall Grading of Pigments' Inhibitive Performance | Observation |
|---|---|---|---|
| None | Extensive delamination, dense blisters | 0 | Control |
| ZnNCN | Extensive delamination, medium dense blisters | 0 | component phase of synergistic pigment according to Example 1.1 |
| CaSiO$_3$ | Extensive delamination, dense blisters | 0 | " |
| Zn$_3$(PO$_4$)$_2$·(H$_2$O)$_4$ | " | 0 | " |
| 0.6 Zn$_3$(PO$_4$)$_2$·(H$_2$O)$_4$/ZnNCN | Extensive delamination, medium dense blisters | 0 | Combination of component phases of synergistic pigment |
| Zn$_3$(PO$_4$)$_2$·(H$_2$O)/1.1 ZnO | " | 0 | " |
| Synergistic inhibitor pigment according to Example 1.1 | 5 mm creep at scribe, few blisters | 8 | Pigment displays synergy |

TABLE 1.3-continued

Comparative results of corrosion inhibitive performance evaluation of the multi-phase pigment (according to the present invention) and of its component phases.

| Inhibitor Pigment Component of Test Coatings | Status of Test Coatings After 300 Hours | Overall Grading of Pigments' Inhibitive Performance | Observation |
|---|---|---|---|
| SrCrO$_4$ | Limited creep at scribe, few blisters | 9 | Control pigment; standard of the industry |

The origins of the tested pigment grade products, which are also component phases of the multi-phase corrosion inhibitor pigment synthesized according to Example 1.1., were as follow:

| Pigment Grade Product | Manufacturer | Commercial Code |
|---|---|---|
| ZnNCN | Wayne Pigment Corp. | Wayncor 200 |
| Zn$_3$(PO$_4$)$_2$·(H$_2$O)$_4$ | Wayne Pigment Corp. | Wayncor 221 |
| SrCrO$_4$ | Wayne Pigment Corp. | SrCrO$_4$ - 176 |
| CaSiO$_3$ | Commercial Product | |
| 0.6Zn$_3$(PO$_4$)$_2$·(H$_2$O)$_4$/ZnNCN | Comparative Example 1 | |
| Zn$_3$(PO$_4$)$_2$·(H$_2$O)$_4$/1.1 ZnO | Comparative Example 2 | |

Based on the above presented results of the comparative evaluation, it can be concluded, that the multi-component pigment according to Example 1.1., versus its component phases, displays significantly enhanced corrosion inhibitive activity on steel (overall performance grade: 8), which is quite comparable to the performance of the industry's standard, pigment grade SrCrO4 (overall performance grade: 9).

The observed performance enhancement is interpreted as a sign of synergistic behavior of the multi-phase pigment system of the present invention with respect to corrosion inhibition.

What is claimed is:

1. A synergistic corrosion inhibiting composition for application to a metal comprising ZnNCN, ZnO, and at least one other compound having a cation selected from Al, Mg, Ca, Sr, Ti, Zr, Ce and Fe and a plurality of anions selected from phosphates, polyphosphates, phosphites, molybdates, and silicates.

2. A synergistic corrosion-inhibiting composition for application to a metal surface selected from Fe, Al, and Cu comprising ZnNCN, ZnO, CaSiO$_3$, Sr CO$_3$ and Zn$_3$(PO$_4$)$_2$·(H$_2$O)$_4$.

3. A composition according to claim 2 wherein said CaSiO$_3$ and SrCO$_3$ are surface modified by formation of chemisorbed insoluble Ca-phosphate and Sr-phosphate on the surfaces of CaSiO$_3$ and SrCO$_3$ particles.

* * * * *